(12) United States Patent
Purgason

(10) Patent No.: US 11,801,821 B2
(45) Date of Patent: Oct. 31, 2023

(54) BRAKE WEAR SENSING APPARATUS AND SYSTEM

(71) Applicant: Bendix Commercial Vehicle Systems LLC, Elyria, OH (US)

(72) Inventor: Scott T Purgason, North Olmsted, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 585 days.

(21) Appl. No.: 17/103,236

(22) Filed: Nov. 24, 2020

(65) Prior Publication Data

US 2022/0161776 A1    May 26, 2022

(51) Int. Cl.
| | |
|---|---|
| *B60T 17/22* | (2006.01) |
| *F16D 66/02* | (2006.01) |
| *G01B 7/16* | (2006.01) |
| *F16D 66/00* | (2006.01) |

(52) U.S. Cl.
CPC .......... *B60T 17/221* (2013.01); *F16D 66/022* (2013.01); *F16D 66/027* (2013.01); *G01B 7/16* (2013.01); *F16D 2066/006* (2013.01)

(58) Field of Classification Search
None
See application file for complete search history.

(56) References Cited

U.S. PATENT DOCUMENTS

| | | |
|---|---|---|
| 2012/0111101 A1 | 5/2012 | Knorr-Bremse |
| 2017/0335912 A1 | 11/2017 | Koh |

FOREIGN PATENT DOCUMENTS

| | | | |
|---|---|---|---|
| DE | 4243875 A1 | 7/1994 | |
| DE | 102014105561 A1 | 10/2015 | |
| DE | 202018106957 U1 * | 4/2020 | |
| EP | 3618020 A1 * | 3/2020 | ........... F16D 66/024 |
| WO | WO-9509991 A1 * | 4/1995 | ........... F16D 65/568 |
| WO | WO-2018050561 A1 * | 3/2018 | ........... A61B 3/0025 |
| WO | 2010108663 A1 | 9/2019 | |

OTHER PUBLICATIONS

European Patent Office, "International Search Report and Written Opinion," Search Report, dated Mar. 11, 2022, 11 pages, European Patent Office, Rijswijk Netherlands.

(Continued)

*Primary Examiner* — Melanie Torres Williams
(74) *Attorney, Agent, or Firm* — Cheryl L. Greenly; Brian E. Kondas

(57) ABSTRACT

A brake wear sensing assembly for an air disc brake includes a progressive wear sensor, at least one lining wear sensor, a control device, a wire harness connected to the control device and an adapter for joining the progressive wear sensor and the lining wear sensor to the wire harness. The adapter connects a power line to the progressive wear sensor, a ground line to the progressive wear sensor and an input to the output of the at least one lining wear sensor. An output signal from the progressive wear sensor is connected to the input of the at least one lining wear sensor. The signal from the progressive wear sensor passes through the at least one lining wear sensor to the control device such that the progressive wear sensor and the at least one lining wear sensor are in series with each other.

12 Claims, 4 Drawing Sheets

(56) References Cited

OTHER PUBLICATIONS

Bendix Spicer Foundation Brake LLC, "Air Disc Brake (SB-6 and SB-7)", Service Data Sheet SD-23-7550, 2020, 36 pages, Bendix Spicer Foundation Brake LLC, Elyria Ohio U.S.A.
Bendix Spicer Foundation Brake LLC, "Bendix ADB22X, ADB22X-V & ADB22X-LT air disc brakes," Service Data Sheet SD-23-7541, Jul. 2020, 48 pages, Bendix Spicer Foundation Brake LLC, Elyria OH U.S.A.

* cited by examiner

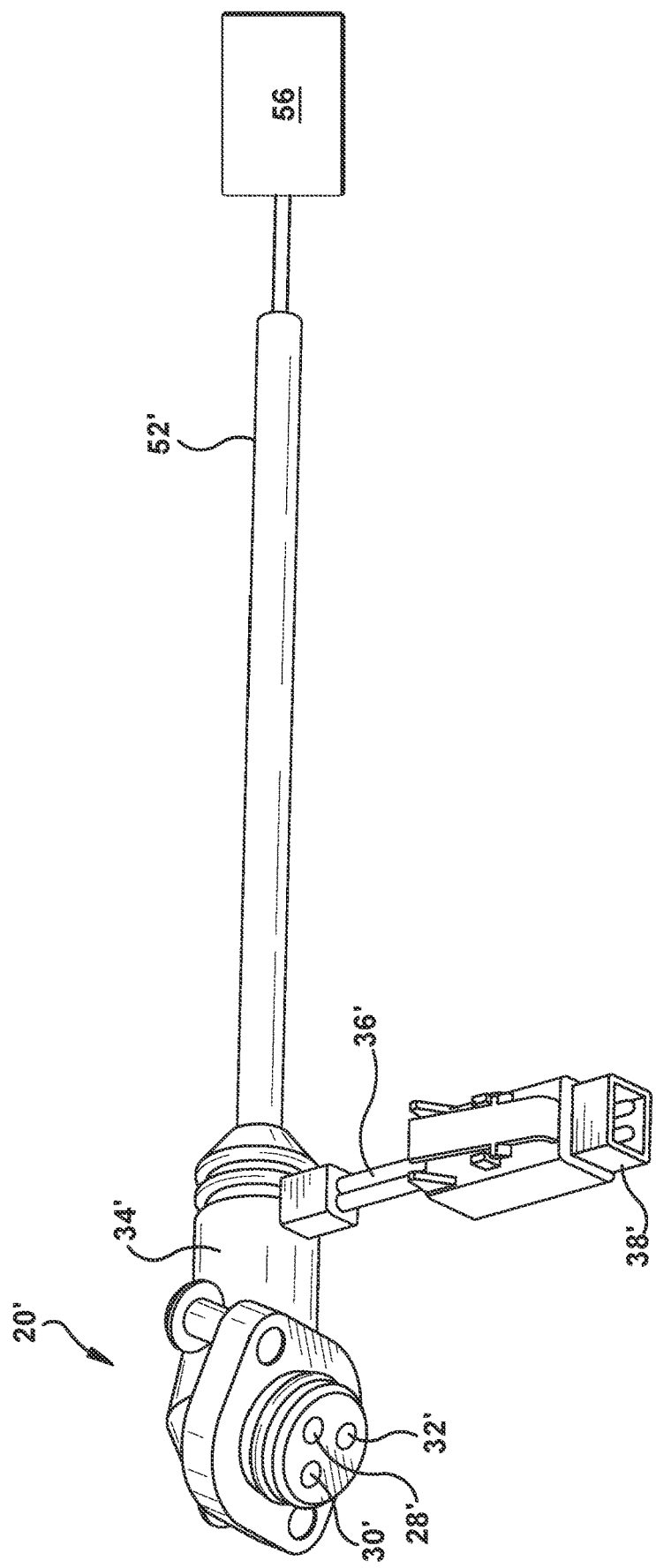

BRAKE WEAR SENSING APPARATUS AND SYSTEM

BACKGROUND

The present application relates to a brake wear sensing apparatus, adapter and system for commercial vehicles. Commercial vehicles may be equipped with air disc brakes at each wheel end. Brake pad wear for an air disc brake assembly depends on the frequency of use of the brakes and installation factors. Different types of brake wear sensors are available for air disc brake assemblies to assist the vehicle owners and technicians in understanding when brake pads and rotors need to be replaced. One example is a progressive wear sensor that actively measures total friction couple wear. Another example is an in-pad switch sensor where the circuit is opened when the pad is worn through to a specified thickness. Both types of sensors have advantages and disadvantages. Putting both types of sensors on an air disc brake assembly is complicated because of the wiring necessary to provide power and receive a signal from each of these devices. Wireless sensors continue to be more expensive and less reliable than wired sensors. Accordingly, those skilled in the art continue with research and development efforts in the field of brake wear sensing assemblies.

SUMMARY

In accordance with one embodiment, an adapter for a brake wear sensing system includes a body. The body has a first end and a second end. The body includes a first input located at the first end of the body for receiving power, a second input located at the first end the body for receiving ground and a third input located at the first end of the body. The body includes a first output located at the second end for transmitting power, a second output located at the second end for transmitting ground and a third output located at the second end. A plug is attached to the body having a first socket and a second socket. The first input and first output are directly connected, the second input and second output are directly connected and the third input is connected to the first socket and the third output is connected to the second socket. The first end of the adapter is configured to connect to an associated control device, the second end of the adapter is configured to connect to an associated second wear sensor and the plug is configured to connect to a first wear sensor.

In another embodiment, a brake wear sensing assembly for an air disc brake includes progressive wear sensor at least one lining wear sensor, a control device, a wire harness connected to the control device and an adapter for joining the progressive wear sensor and the lining wear sensor to the wire harness. The adapter connects a power line from the wire harness to a power line in the progressive wear sensor, a ground line from the wire harness to a ground line in the progressive wear sensor and an input from the at least one lining wear sensor to the wire harness and an output signal from the progressive wear sensor to an input to the at least one lining wear sensor. The output signal from the progressive wear sensor passes through the at least one lining wear sensor to the control device through the adapter such that the progressive wear sensor and the at least one lining wear sensor are in series with each other.

BRIEF DESCRIPTION OF THE DRAWINGS

FIG. 4 is an example of another adapter for use in the brake wear sensing assembly.

DETAILED DESCRIPTION

Figure 1:
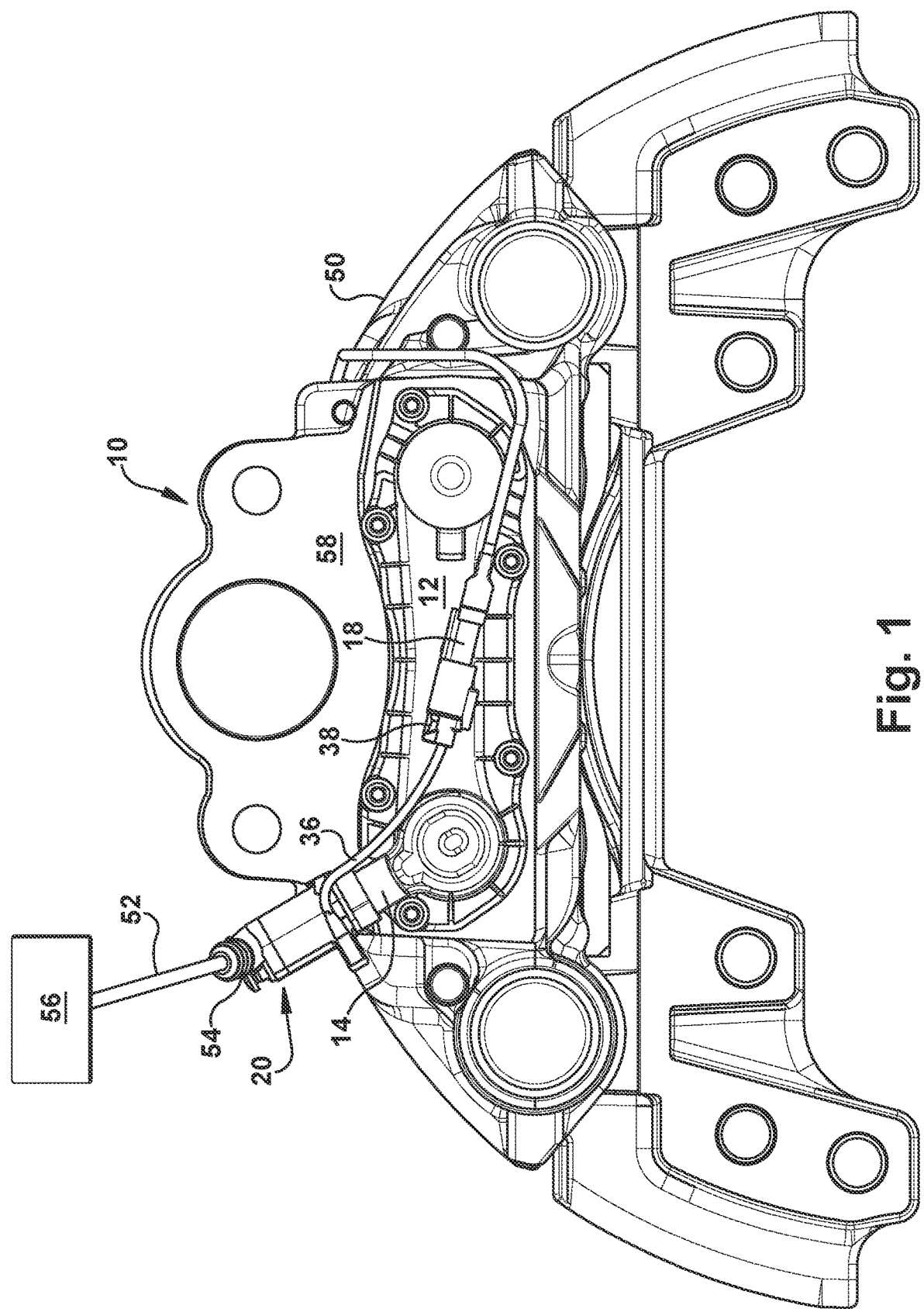
FIG. 1 is the brake wear sensing assembly having an adapter according to one example.

Referring to FIG. 1, a wear sensing assembly 10 for an air disc brake 50 as found on a commercial vehicle is shown. The wear sensing assembly 10 includes a progressive wear sensor 12 and at least one in pad wear sensor 16 (not shown on FIG. 1).

The progressive wear sensor 12 is mounted on a face of a caliper 58 of the air disc brake 50. The progressive wear sensor 12 measures the total friction couple wear by measuring the distance between the inboard pad, the rotor and the outboard pad. The progressive wear sensor 12 transmits analog signals indicative of the actual distance between those elements of the air disc brake 50, ranging from 100% to 0% remaining life of the entire friction couple. A running clearance is also part of the total distance measured. In one example of a progressive wear sensor, the voltage increases as the distance between those elements of the friction couple of the air disc brake 50 decreases. The progressive wear sensor 12 is generally more accurate of wear early in the life of the air disc brake 50. The progressive wear sensor 12 is mechanically reset when the new friction pads are installed. The progressive wear sensor 12 includes a socket connector 14 for receiving power and ground and for transmitting the output signal.

The at least one in pad wear sensor 16 may comprise two in pad wear sensors; 16a for the inboard pad and 16b for the outboard pad. The in pad wear sensors 16a, 16b are embedded in the friction material of the pads and are not visible in FIG. 1. Once the friction material is at a certain thickness, the sensing wire embedded in the pad becomes worn through. The circuit that makes up the in pad wear sensor 16 will be opened when the friction material covering the wire is gone and the wire is broken. When two in pad wear sensors 16a, 16b are used, they are connected in series such that if one in pad wear sensor 16a has an open circuit, no signal will be transmitted from either in pad wear sensor 16a, 16b. If only one in pad wear sensor is present, it is commonly the inboard pad wear sensor 16a. The at least one in pad wear sensor 16 may include a socket connector 18 for receiving a power signal and for transmitting the same power signal through the in pad wear sensor 16 back to the socket connector 18 as long as the circuit is closed. In lieu of a socket connector 18, the at least one in-pad wear sensor 16 may be connected directly to a harness 36.

A control device 56 is mounted on the vehicle to monitor the wear sensing assembly 10. The control device 56 may be a stand-alone wear sensing device or include logic for brake control or other vehicle functions. A wire harness 52 from the control device 56 terminates in a first three pin plug connector 54. The control device 56 may receive sensor inputs from four to eight sensor assemblies, depending on the number of wheel ends on the commercial vehicle. Each sensor assembly would have its own plug connector from the control device 56. A single wheel end and single plug connector are shown in FIG. 1.

The control device 56 may sample the signal transmitted by the wear sensing assembly 10 periodically, for example every thirty seconds. The control device 56 interprets the signals it receives. For example, the control device 56 determines that the overall friction coupling is reduced because the voltage output from the progressive wear sensor 12 has increased above a predetermined level. The voltage signal to the control device 56 is interrupted when the at least one in pad sensors 16 is an open circuit. The control device 56 sends a maintenance condition request or other message on a vehicle communications bus or alternatively lights a diagnostic lamp in response to either of those signal conditions because maintenance to the air disc brake 50 is likely required.

The wear sensing assembly 10 also includes an adapter 20 to be connected between the plug connector 54 of the control device 56, the progressive wear sensor socket connector 14 and the at least one in pad wear sensor socket connector 18. The adapter 20 includes a wire harness 36 that may terminate in a plug connector 38 for connection to the at least one in pad wear sensor socket connector 18. Alternatively, the adapter 20 may be directly connected to the at least one in pad wear sensor 16 without any intervening plug and socket connector. The configuration of the adapter 20 allows the single wire harness 52 from the control device 56 to be used for transmitting power to and receiving signals from both the progressive wear sensor 12 and the at least one in pad wear sensor 16. In prior art wear sensing assemblies, separate wire harnesses for the in pad sensors and the progressive wear sensors were necessary, requiring more inputs and outputs on the control device 56.

Therefore, a brake wear sensing assembly for an air disc brake includes progressive wear sensor at least one lining wear sensor, a control device, a wire harness connected to the control device and an adapter for joining the progressive wear sensor and the lining wear sensor to the wire harness. The adapter connects a power line from the wire harness to a power line in the progressive wear sensor, a ground line from the wire harness to a ground line in the progressive wear sensor and an input from the at least one lining wear sensor to the wire harness and an output signal from the progressive wear sensor to an input to the at least one lining wear sensor. The output signal from the progressive wear sensor passes through the at least one lining wear sensor to the control device through the adapter such that the progressive wear sensor and the at least one lining wear sensor are in series with each other.

Figure 2:
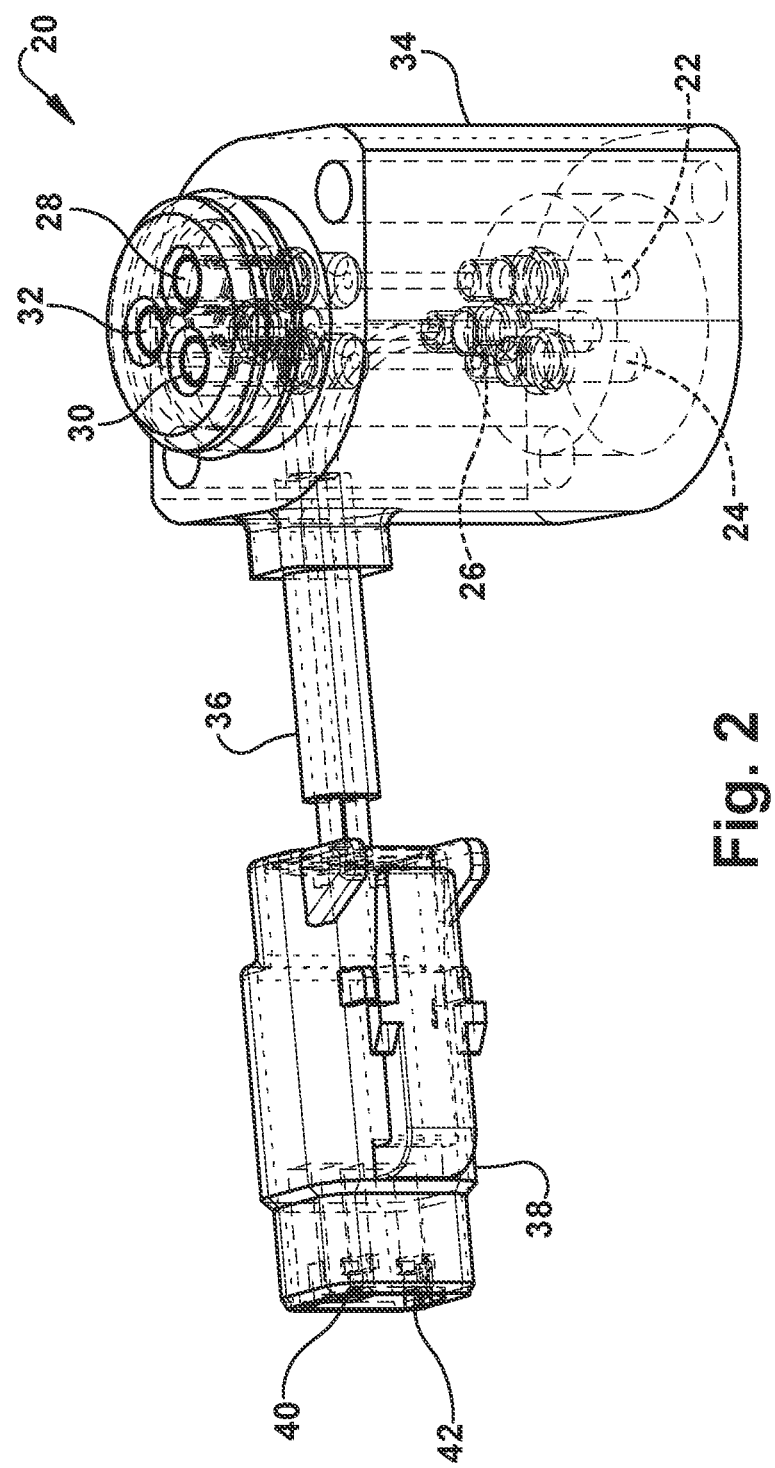
FIG. 2 is an X-ray view of the adapter for use in the brake wear sensing assembly.

Referring to FIG. 2, an Xray view of the adapter 20 is shown. The adapter 20 comprises a body 34, a cable 36 and a plug connector 38. Inside the body 34, there is a first pin 22 in the first end of the body 34. The first pin 22 receives power from the control device 56. There is a second pin 24 in the first end of the body 34 which is connected to ground through the control device 56. A third pin 26 is connected by soldering, wire wrapping or crimping to the cable 36 and is used to transmit the sensor signal from the at least one in pad wear sensor 16 to the control device 56.

Inside the body 34 at the second end, opposite the first end, there is a first receptacle 28 that is physically connected through the body 34 to the first pin 22. The physical connection may be through a wire, soldering or through a conductive metal piece. There is a second receptacle 30 connected through the body 34 to the second pin 24. A third receptacle 32 in the second end of the body 34 is connected by soldering, wire wrapping or crimping to the cable 36 and is used to transmit the sensor signal from the progressive wear sensor 12 to the at least one in pad wear sensor 16.

The body 34 may be of molded plastic with the pins 22, 24, 26 and receptacles 28, 30, 32 assembled prior to the molding process. The body 34 is generally cylindrical and about 1.5 inches long and about 1.25 inches in diameter. The body 34 is molded such that the body 34 will mate with a European style connector.

The cable 36 extends from the body 34 and may be at a right angle to an axis of the body 34. At the end of the cable 36 is the plug connector 38 having a first socket 40 connected to the third receptacle 32 and a second socket 42 connected to the third pin 26. The length of the cable 36 may between about two inches to about twelve inches. The plug connector 38 may be any standard connector, such as a Deutsch DTM series connector.

With this configuration, the single adapter 20 is used to transmit the progressive wear signal to the control device 56 until the in pad wear sensor becomes an open circuit. At that time, no signal is transmitted to the control device 56. The control device 56 will interpret both the progressive wear signal and the open circuit to determine the amount of wear at the disc brake.

Therefore, an adapter for a brake wear sensing system includes a body. The body has a first end and a second end. The body includes a first input located at the first end of the body for receiving power, a second input located at the first end the body for receiving ground and a third input located at the first end of the body. The body includes a first output located at the second end for transmitting power, a second output located at the second end for transmitting ground and a third output located at the second end. A plug is attached to the body having a first socket and a second socket. The first input and first output are directly connected, the second input and second output are directly connected and the third input is connected to the first socket and the third output is connected to the second socket. The first end of the adapter is configured to connect to an associated control device, the second end of the adapter is configured to connect to an associated second wear sensor and the plug is configured to connect to a first wear sensor.

Figure 3:
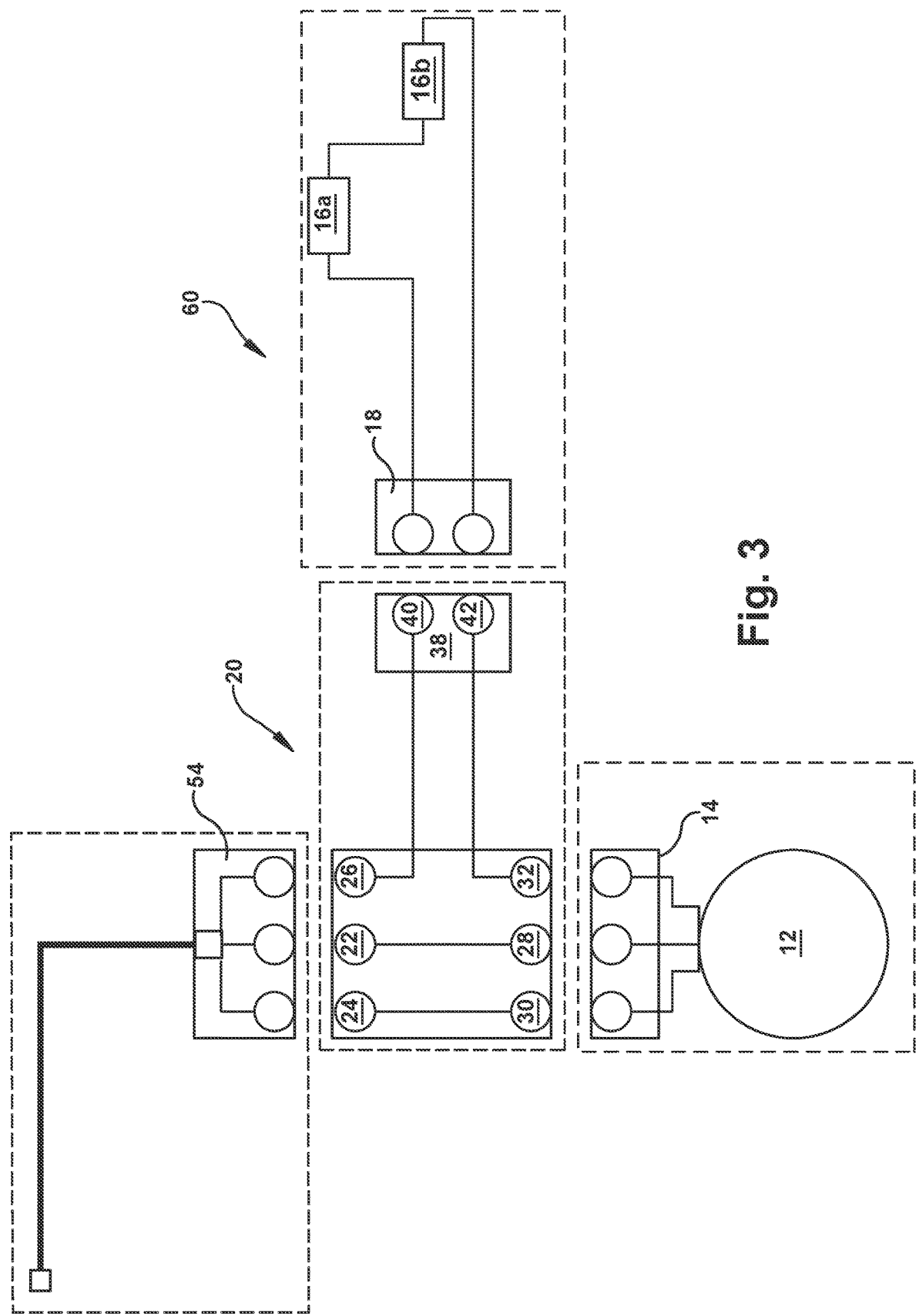
FIG. 3 is an electrical schematic of the brake wear sensing assembly having the adapter.

In FIG. 3, a circuit diagram 60 for the wear sensing assembly 10 having the adapter 20 is shown. The plug connector 54 from the control device 56 connected to the pins 22, 24, 26 of the adapter 20. Second pin 24 is directly connected to second receptacle 30 and first pin 22 is directly connected to first receptacle 28. Third pin 26 is connected through cable 36 to the first socket 40 of the plug connector 38. Third receptacle 32 is connected to the second socket 42 of the plug connector 38.

The receptacles 28, 30, 32 are connected to the progressive wear sensor socket connector 14 and the plug connector 38 is connected to the in pad wear sensor socket connector 18.

In operation, the power and ground signals are provided from the control device 56 through the plug connector 54. The adapter 20 receives power and ground and passes power and ground through to the progressive wear sensor 12 through socket connector 14. The progressive wear sensor 12 transmits signals regarding the wear state of the friction couple of the air disc brake 50. This signal is transmitted on socket connector 14 to third receptacle 32 of the adapter 20. This signal is then transmitted to the second socket 42 of the plug connector 38 to the socket connector 18 of the at least one in pad wear sensor 16. The signal passes through the closed circuit formed by in pad wear sensor 16a, 16b back to socket connector 18 and to the first socket 40 of plug connector 38. This signal is transmitted to pin 26 of the adapter 20 and then through plug connector 54 back to the control device 56.

The control device 56 may sample the signal continuously or periodically.

When either of the in pad sensors 16a, 16b are worn such that their wire becomes an open circuit, no signal is transmitted through socket connector 18 through adapter 20 to the control device 56. When the signal is interrupted, meaning that the voltage is no longer present, the control device 56 knows that at least in pad wear sensor 16a or in pad wear sensor 16b is worn to a level that requires replacement. Since it is recommended that both pads be replaced during maintenance, it is not necessary to know exactly which pad has exhibited the most wear.

In FIG. 4, a second example of an adapter 20' is shown. In this example, the adapter 20' is integrated with the plug from the control device 56. Cable 52' goes directly from the control device 56 to the adapter 20'.

The adapter 20' has a body 34' with receptacles 28', 30', 32'. The body 34' is designed to mate with the socket connector 14 of the progressive wear sensor 12. Plug connector 38' is connected by cable 36' to the body 34'. Plug connector 38' mates with the at least one in pad wear sensor 16.

In prior art systems, a wire harness had to have at least five pins or be two separate wire harnesses in order to accommodate both a progressive wear sensor and an in pad wear sensor. In some instances, there may have been two control devices, one for the progressive wear sensor input and one for the in pad wear sensors.

Another advantage presented by the apparatus of the present invention include less opportunity for the wire harnesses for the wear sensing devices to be mis-installed. The simplified wiring of the sensors using the adapter 20 or adapter 20' can save installation time. Cost for the original equipment manufacturer is saved by having less wiring and fewer wire harnesses overall. Fewer inputs are needed on the control device to be dedicated to wear sensing signals, allowing the control device to also perform other functions on the vehicle.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. An adapter for a brake wear sensing system comprising:
    a body; the body having
        a first end and a second end;
        a first input located at the first end of the body for receiving power;
        a second input located at the first end the body for receiving ground;
        a third input located at the first end of the body;
        a first output located at the second end for transmitting power;
        a second output located at the second end for transmitting ground;
        a third output located at the second end; and
    a plug attached to the body, the plug having
        a first socket; and
        a second socket; wherein the first input and first output are directly connected, the second input and second output are directly connected and the third input is connected to the first socket and the third output is connected to the second socket, wherein the first end of the adapter is configured to connect to an associated control device, the second end of the adapter is configured to connect to an associated first sensor and the plug is configured to connect to an associated second sensor.

2. The adapter as in claim 1, wherein the third input transmits a signal received from the associated second sensor to the associated control device and the third output receives a signal from the associated first sensor to transmit to the associated second sensor.

3. The adapter as in claim 1, wherein the associated first sensor is a progressive wear sensor and the associated second sensor is at least one lining wear sensor.

4. The adapter as in claim 1, wherein the first, second and third inputs are metal pins and the first, second and third outputs are metal receptacles.

5. The adapter as in claim 4, wherein the body is generally cylindrical and comprises a molded plastic surrounding the metal pins and metal receptacles.

6. A brake wear sensing assembly for an air disc brake
    a progressive wear sensor;
    at least one lining wear sensor, having a normally closed wire;
    a control device;
    a wire harness connected to the control device; and
    an adapter for joining the progressive wear sensor and the at least one lining wear sensor to the wire harness, wherein adapter connects a power line from the wire harness to a power line in the progressive wear sensor, a ground line from the wire harness to a ground line in the progressive wear sensor and an input from the at least one lining wear sensor to the wire harness and an output signal from the progressive wear sensor to an input to the at least one lining wear sensor; wherein the output signal from the progressive wear sensor passes through the at least one lining wear sensor to the control device through the adapter, thereby placing the progressive wear sensor and the at least one lining wear sensor in series.

7. The brake wear sensing assembly as in claim 6, wherein the signal from the progressive wear sensor is interrupted when the normally closed wire of the at least one lining wear sensor is opened.

8. The brake wear sensing assembly as in claim 6, wherein the control device transmits a maintenance condition request when the normally closed wire of the at least one lining wear sensor is open.

9. The brake wear sensing assembly as in claim 6, wherein the control device receives the signal from the progressive wear sensor when the normally closed wire of the at least one lining wear sensor is closed.

10. The brake wear sensing assembly as in claim 6, wherein the at least one lining wear sensor is two lining wear sensors connected in series, wherein the normally closed wire of either of the two lining wear sensors is an opened, the progressive wear sensor signal is interrupted.

11. The brake wear sensing assembly as in claim 6, wherein the adapter is integrated with the wire harness from the control device.

12. The brake wear sensing assembly as in claim 6, wherein the adapter further comprises a plug for connecting to the at least one lining wear sensor.

* * * * *